V. de M. UPHAM.

Machine for Heading Rivet and Screw Blanks.

No. 9,027. Reissued Jan. 6, 1880.

*Witnesses:*

Howard F. Stevens
Blomfield Littell.

*Inventor:*

Victor de M. Upham
per Forbes & Jones
Attys.

2 Sheets—Sheet 2.
V. de M. UPHAM.
Machine for Heading Rivet and Screw Blanks.
No. 9,027. Reissued Jan. 6, 1880.
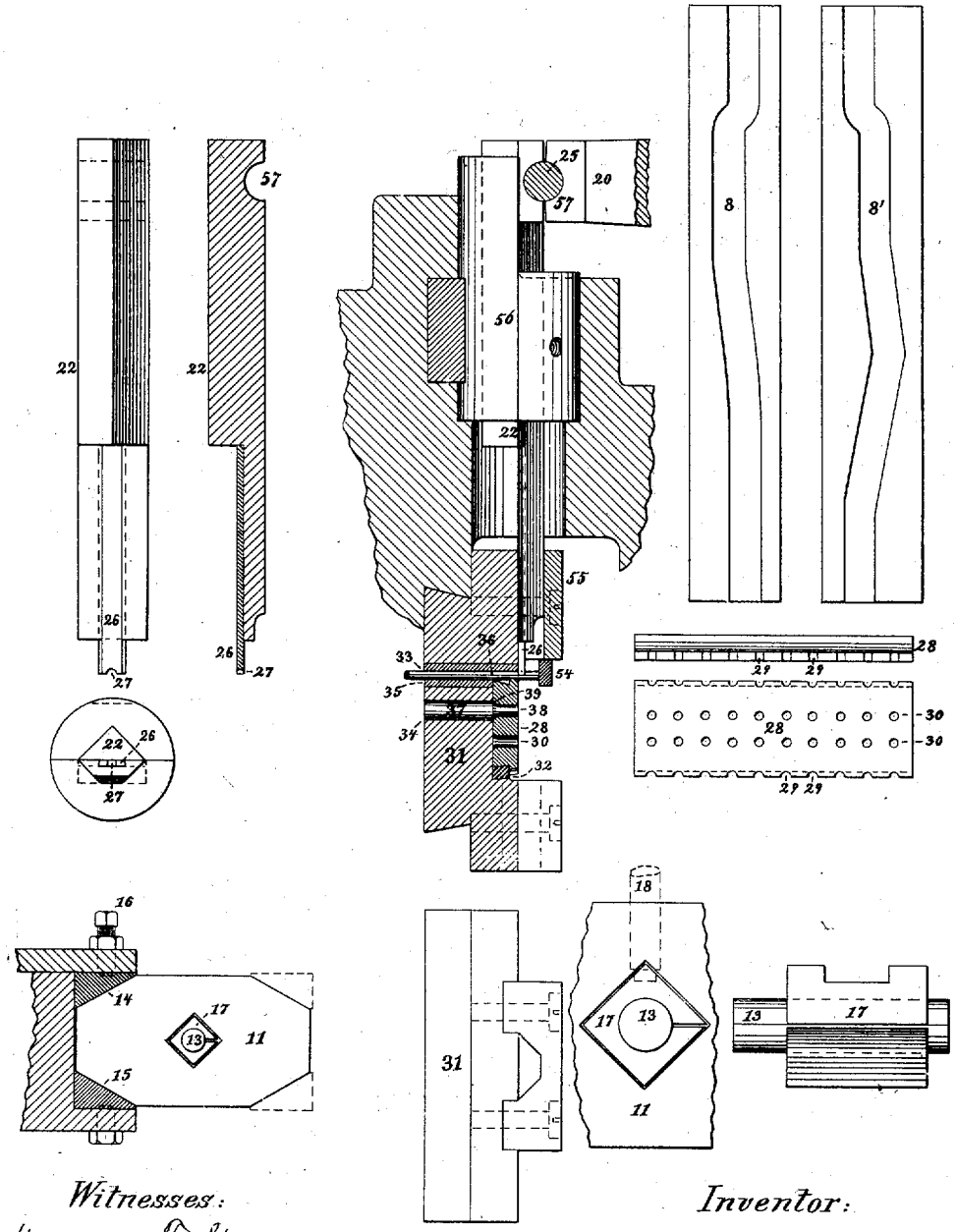
Witnesses:
Howard F. Stevens
Bloomfield Littlett
Inventor:
Victor de M. Upham
per Fordes & Jones
Attys

UNITED STATES PATENT OFFICE.

VICTOR DE M. UPHAM, OF BROOKLYN, NEW YORK.

MACHINE FOR HEADING RIVET AND SCREW BLANKS.

SPECIFICATION forming part of Reissued Letters Patent No. 9,027, dated January 6, 1880.

Original No. 110,515, dated December 27, 1870; antedated December 10, 1870. Application for Reissue filed June 12, 1879.

*To all whom it may concern:*

Be it known that I, VICTOR DE M. UPHAM, of the city of Brooklyn, in the county of Kings and State of New York, have invented a new and useful Improvement in Machines for Making Rivet and Screw Blanks; and I hereby declare that the following is a full, clear, and exact description thereof, reference being had to the accompanying drawings, forming a part of this specification, in which—

Figure 1:
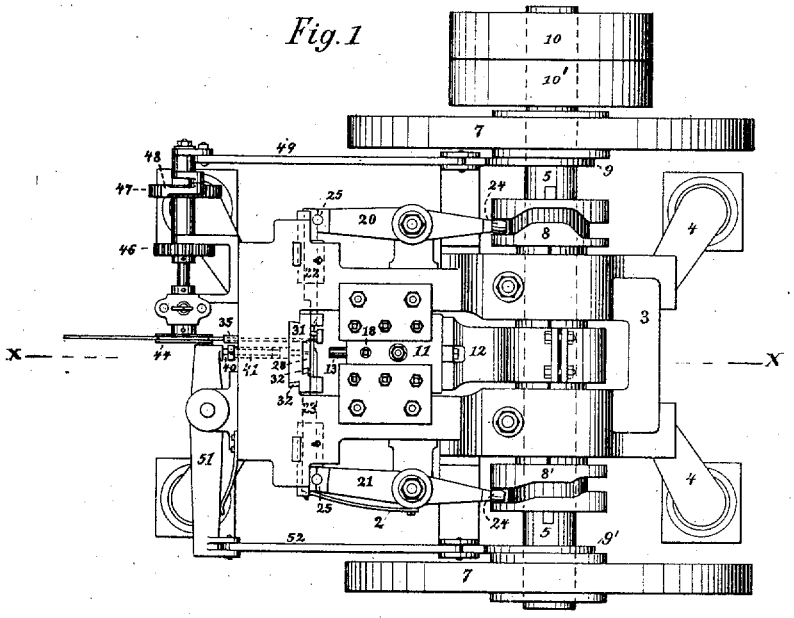
Figure 2:
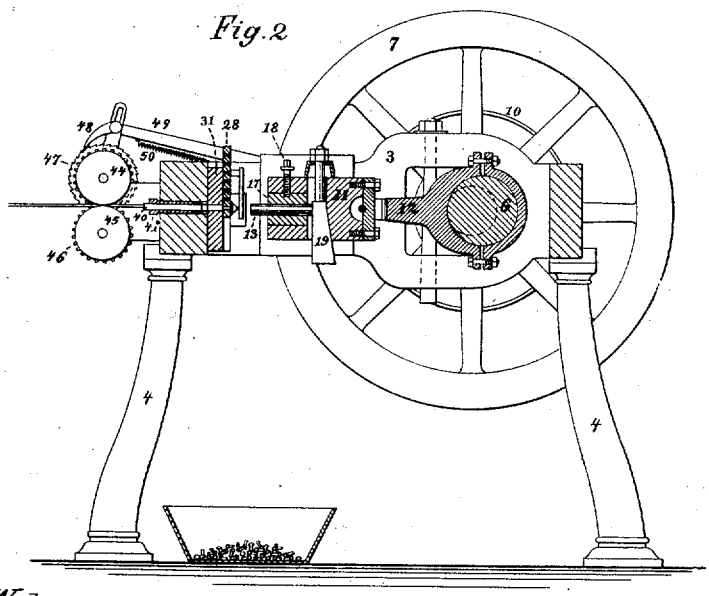

Figure 1, Sheet 1, represents a plan view, and Fig. 2, Sheet 1, a vertical longitudinal section of the same through the line *x x*.

Sheet 2 of the drawings includes various details of the machine hereinafter particularly referred to, and designated by the same letters that indicate corresponding parts in Figs. 1 and 2.

In order to enable others to construct and understand my invention, I will first proceed to describe the construction, organization, and operation of a machine embodying the same, and subsequently to point out in the claims its novel features.

3 represents the bed or frame-work of the machine, composed of a single casting, and to which are connected the various operative parts, the whole being supported by suitable legs 4 4. The sides of this frame-work are thickened near the end to provide for the reception of the journals of the main or driving shaft. This shaft 5 is provided with the main eccentric 6, formed in a single piece therewith, the fly-wheels 7 7, located upon opposite sides of the frame-work, the grooved cams 8 8′, arranged adjacent thereto, the cams 9 9′, and the usual fixed and loose belt-pulleys 10 10′.

The eccentric 6 imparts a direct reciprocating movement to the cross-head 11 through the intermediate connecting-rod 12, the cross-head moving in suitable guideways in the frame-work and carrying the hammer or heading device 13.

It is usual to elevate the bearings supporting the main shaft, and also the die-block, above the center line of the frame, and in many instances the main shaft is placed below the plane in which the hammer-block moves.

In such arrangement the indirect action causes the frame to spring; but in my invention the greatest strength of metal is disposed directly in line with the strains, thereby insuring great strength and solidity.

The cross-head 11 is formed with beveled bearing-surfaces, which rest and slide upon triangular blocks 14 15 fitted within the guideways, (shown in the enlarged end view, Sheet 2,) the upper block, 14, being adjusted to remedy lost motion by wear of the sliding surfaces by means of the set-screws 16. The great width of the cross-head 11 provides for an extended bearing to the end of the connecting-rod 12, which is widened to correspond, and secures stability.

The hammer or heading device 13 is preferably made of circular cross-section, and is secured within a split bushing, 17, fitted in the cross-head, and compressed and held in place by a set-screw, 18. (Shown in the enlarged view, Sheet 2.) This bushing is arranged within the cross-head in an angular position, as shown, so that an adjustment of the hammer may be effected in any desired direction by means of liners placed upon either of its bearing-surfaces.

The rear end of the hammer or heading device abuts against a key, 19, which may be raised or lowered to effect a longitudinal adjustment of the hammer which regulates the thickness of the rivet or blank head. The grooved cams 8 8′ engage with the vibrating levers 20 21, which operate, respectively, the cutter and finger bars 22 23.

The transverse movements of the cutter and finger bars are governed by the contour of the circumferential grooves in the cams 8 8′, which are illustrated on a plane in the enlarged views, Sheet 2.

At each revolution of the main shaft 5 the wire from which the rivets or blanks are formed is fed to the machine, cut to the desired length, transferred, headed, and ejected therefrom, and the coincident movements of the cutter and finger are regulated to perform their respective functions at particular times by the variable contour of the grooves in the cams 8 8′.

The vibrating levers 20 21 are provided at their rear ends with friction-rollers 24 24, which engage with the grooves in the cams 8 8′, the forward or opposite ends being connected directly to the cutter and finger bars 22 23 by a vertical coupling-pin, 25, which fits into semicircular recesses 57, formed in the side of the bars and upon the forward end of the levers 20 21, forming a working joint and permitting a removal of the bars for repair or substitution by disengaging the pin.

To remedy lost motion occasioned by wear of these co-operative parts, the ends of the levers and guideways of the bars are fitted with brasses in the usual manner, and a flat spring, 2, is secured to the vibrating lever 21 and caused to bear upon the end of the finger-bar 23. The pressure of the spring will take up the lost motion of the lever 21 at each end until the wire is grasped, when it will be held by the tension of the spring within the limit of the lost motion, the movement of the parts being positive beyond such limit.

The cutter and finger bars 22 23 may be made of any desirable form in cross-section, so that the working-faces will act at all times in their proper path relative to the die, to insure which I have arranged a bearing, 55, adjacent to the die-plate, and also near the opposite end of each, 56, and made the same adjustable in one direction, whereby compensation for wear may be readily effected.

The construction of the cutter and finger is fully illustrated in the enlarged and detached views, Sheet 2, the cutter-bar 22 being cut away a part of its length and provided with a thin cutter, 26, of steel, fitted within a dove-tailed groove, as shown, its end or cutting-edge formed with semicircular grooves 27 for grasping the wire.

The finger-bar 23 is arranged directly opposite to, and is constructed exactly like, the cutter-bar 22, except that its end is not formed to produce a cutting action, but merely to bear upon and co-operate with the cutter in grasping the wire and transferring the blank to the position for heading.

28 represents the die-plate, which is constructed of steel and provided with a series of cutting-recesses, 29, located upon its edges, and a corresponding series of die-openings or perforations, 30, the die being arranged at a right angle with the cutter and finger bars 22 23, and capable of reversal and adjustment thereto upon the frame of the machine. As shown, its edges are made to project slightly, and through the same the semicircular cutting-recesses 29 are located, the perforations or die-openings 30 being placed opposite.

Heretofore die-plates have been made with openings, the edge of one serving to cut the blank; but the semicircular groove in my invention, forming the cutting-edge, is found in practice to be a great improvement, for as the surface wears the edge of the plate can be heated, hammered up, and filed or ground the same any cutting-tool. These cutting-recesses and die-openings may be of corresponding or of different sizes, so that rivets or blanks of different diameters may be made in the same die-plate.

Each cutting-recess is located directly opposite a corresponding die-opening, which are used in connection with each other; but the opposite series upon the other edge of the plate may be staggered to prevent weakness.

The die-plate may be attached directly to the frame of the machine, or to an intermediate die-block, 31, by a dovetail connection, as shown, which will admit of a ready removal and adjustment of the die-plate and block, the parts being secured in position by a key, 32.

The die-block 31 is fitted and secured to the frame-work 3, and provided with apertures 33 34, which register with a cutting-groove and its corresponding die-opening in the die-plate.

The aperture 33 is provided for the passage of the wire to the die-plate, and contains a removable bushing, 35, which may be changed to suit different sizes of wire. This bushing is cut away at 36 to accommodate the cutting-edge of the die-plate, which is adjusted to cause a cutting-groove to register therewith and the corresponding die-opening with the adjacent aperture 34 in the die-block.

In the aperture 34 a steel pin, 37, is loosely fitted, and the corresponding die-opening also contains a similar pin, 38, the adjacent end of the latter having a head, 39, resting in a corresponding counter-sink in the back of the die-plate 28, and bearing upon the pin 37. The pin 37 in turn bears upon a bolt, 40, which slides through a bushing, 41, capable of adjustment within the frame to form rivets or blanks of different lengths, the inner end of the bushing forming a stop to the movement of the bolt 40, which corresponds to the length of the rivet or blank.

The devices for feeding the wire to the machine and ejecting the finished rivet or blank are operated, respectively, by the cams 9 and 9′, attached to the main shaft 5 upon opposite sides of the machine.

The feeding devices consist of feed-rollers 44 45, intersecting in line with the entrance-path of the wire to the machine, and receive their motion through the engaging gear-wheels 46 and ratchet 47, the latter being operated by a pivoted pawl, 48, attached to the connecting-rod 49, which receives its forward motion from the cam 9, its return movement being effected by the spring 50, attached thereto and to the frame of the machine.

The devices for ejecting the finished blank consist of a vibrating lever, 51, pivoted to the frame 3, and operated by the cam 9′ through the connecting-rod 52, the inner end of the lever being arranged to press upon the projecting end of the sliding bolt 40, as shown in Fig. 1.

Having referred to the construction and organization of the various parts composing the machine, I will now explain its operation.

The wire from which the rivets or blanks are made is taken from a coil resting upon a reel near the machine, and fed thereto until its end rests against a stop, 54, Sheet 2, and the ends of the cutter 26 and finger 23 rest against opposite sides of the wire, which bears against a cutting-groove on the edge of the die-plate. All the parts are then in the position shown in the drawings. The cutter 26 and finger 23 are moved together to the right of the machine, the wire being cut by the co-operative action of the moving cutter and stationary cutting-groove in the die-plate. The blank is held by the cutter and finger, and in their continued movement transferred partly across the die-plate until opposite the corresponding die-opening, when the lateral movement is arrested. The hammer 13 now advances and forces the blank into the die-opening, the cutter and finger being simultaneously released from the wire and returned clear of the die-plate. The entrance of the blank into the die-plate displaces the loose pins 37 and 38, which move the bolt 40 until its head comes in contact with the adjustable bushing 41, which stops the movements of these parts, and the hammer upsets the rear end of the blank and forms a head thereon corresponding in shape to the face of the hammer. The hammer is now drawn backward, and the cam 9′ acts upon the rod 52 and vibrating lever 51, and causes the latter to force the bolt 40 inwardly, thus returning the same, together with the pins 37 and 38, to their normal position, and ejecting the finished rivet or screw blank from the die-plate, when it falls into a receptacle beneath the machine. By this time the cam 9 and connecting mechanism have moved the feed-rollers and advanced the wire into the machine and against the stop 54, when the successive operations already described are repeated at every revolution of the main shaft 5.

The variable movements of the operative parts are imparted to the respective devices at such times and to such extent during each revolution of the shaft 5 as to perform their functions in the manner described without interference.

Having thus fully described my invention, what I claim, and desire to secure by Letters Patent, is—

1. In a machine for making rivet and screw blanks, the die-plate 28, having one or more series of semicircular cutting-recesses and corresponding die-openings, in combination with reciprocating cutter and finger bars, substantially as described.

2. The combination, with the reciprocating cutter and finger bars 22 23, of the adjustable bearings 55 56, arranged adjacent to the die-plate and near the opposite ends of said bars, substantially as and for the purpose set forth.

3. The combination of the reciprocating cutter and finger bars, constructed with semicircular recesses 57, the vibrating levers 20 21, with corresponding recesses arranged to register therewith, and the intersecting pin 25 forming a connecting joint, so that the cutter and finger bars may be disconnected by removing the pin 25, substantially as described.

4. The combination, with the die-plate, die-block, adjustable bushing, and lever 51, of the bolt 40 and pins 37 and 38, as and for the purposes set forth.

5. The combination of the cross-head 11 and hammer 13 with the adjustable polygonal bushing 17, substantially as described.

VICTOR DE M. UPHAM.

Witnesses:
CHAS. W. FORBES,
GEO. R. BYINGTON.